Nov. 11, 1924.  1,515,106
J. F. GOETZ
AUTOMOBILE HEATER
Filed May 28, 1923   3 Sheets-Sheet 1

INVENTOR.
Julius F. Goetz.
BY Morsell, Keeney & Morsell
ATTORNEYS

Nov. 11, 1924.
J. F. GOETZ
AUTOMOBILE HEATER
Filed May 28, 1923    3 Sheets-Sheet 2
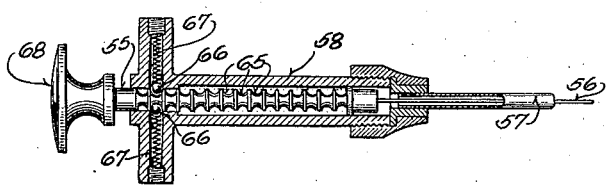
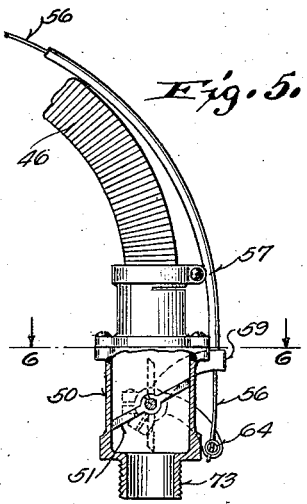
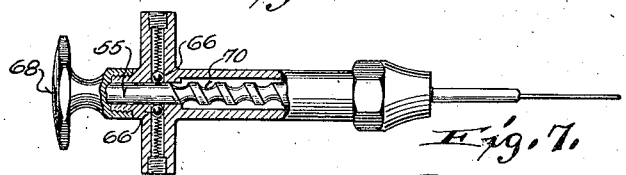
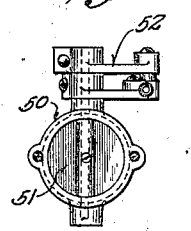
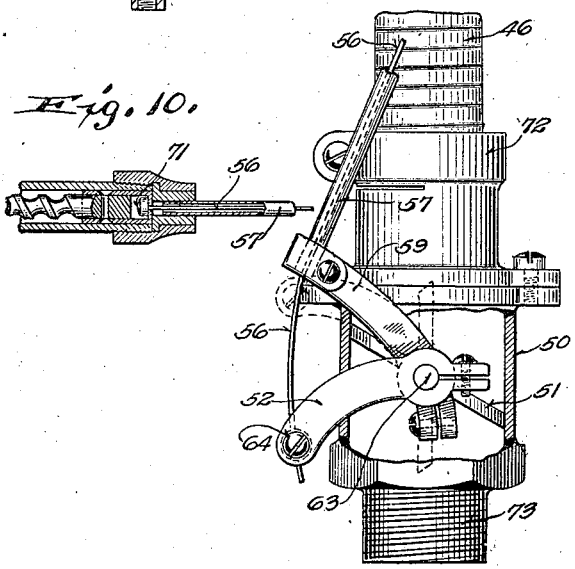
INVENTOR.
Julius F. Goetz.
BY Morsell, Keeny & Morsell
ATTORNEYS Nov. 11, 1924.

J. F. GOETZ 1,515,106

AUTOMOBILE HEATER

Filed May 28, 1923

INVENTOR.

BY Julius F. Goetz.

Morsell, Keeney & Morsell
ATTORNEYS.

Patented Nov. 11, 1924.

1,515,106

UNITED STATES PATENT OFFICE.

JULIUS F. GOETZ, OF HARTFORD, WISCONSIN.

AUTOMOBILE HEATER.

Application filed May 28, 1923. Serial No. 641,956.

*To all whom it may concern:*

Be it known that I, JULIUS F. GOETZ, a citizen of the United States, and resident of Hartford, in the county of Washington and State of Wisconsin, have invented new and useful Improvements in Automobile Heaters, of which the following is a description, reference being had to the accompanying drawings, which are a part of this specification.

This invention relates to improvements in automobile heaters, and has for its principal object to provide a device of this character which is especially adapted for heating the front portion of an automobile.

A further object of the invention is to provide a heater which is primarily, although not solely, intended for heating the portion of an automobile adjacent the driver's seat, from the exhaust gases from the motor.

A still further object of the invention is to provide a heater of the class described in which the said exhaust gases are conducted to a point adjacent the driver's seat, at which point a large portion of their heat units is extracted and radiated to the surrounding air.

A still further object of the invention is to provide a heater of the class described which will be simple in construction, comparatively inexpensive to manufacture and install and more efficient in use than those which have been heretofore proposed.

With the above and other objects in view which will appear as the description proceeds, the invention consists in the novel details of construction and combinations of parts more fully hereinafter disclosed and particularly pointed out in the appended claims.

Referring to the accompanying drawings in which like reference characters designate like parts in all the views;

Fig. 5 is an enlarged detail elevational view, partly broken away, of the valve for controlling the passage of the exhaust gases from the exhaust manifold of the heating member;

Fig. 6 is a sectional plan view, taken approximately on the plane indicated by the line 6—6 of Fig. 5, looking down;

Fig. 7 is a still further enlarged elevational view of the controlling valve shown in Figs. 5 and 6, as seen from the opposite side;

Fig. 8 is a longitudinal sectional elevational view of one form of push rod for controlling the valve shown in Figs. 5, 6 and 7;

Fig. 9 is an elevational view, partly broken away, of a somewhat modified form of push rod for controlling the said valve;

Fig. 10 is a fragmentary longitudinal sectional view of the inner end of the rod shown in Fig. 9;

Figure 1:
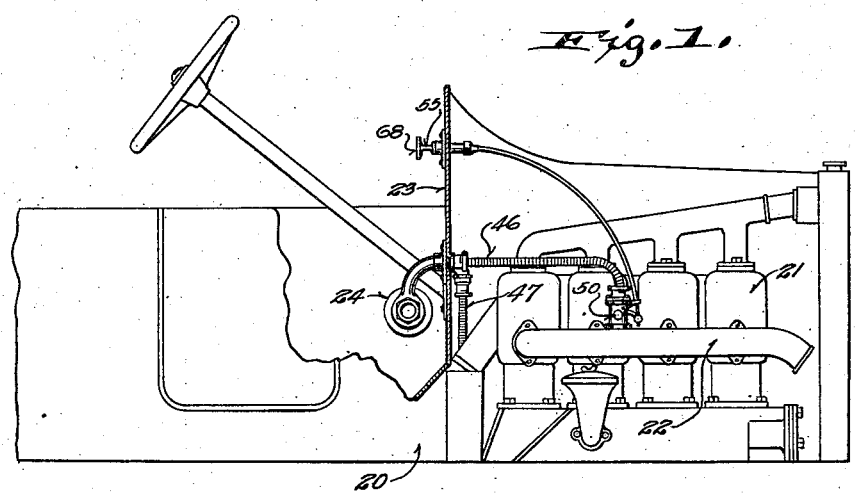
Figure 1 is a diagrammatic side elevational view, partly in section, of a portion of a motor vehicle showing the present invention in place thereon.

In the said drawings the numeral 20 designates generally the body of any suitable motor vehicle, which vehicle is provided with a motor 21 of the well known internal combustion type, having an exhaust manifold 22. The said body is also provided with the usual instrument or dashboard 23 to which the heating element 24 may be attached.

Figure 2:
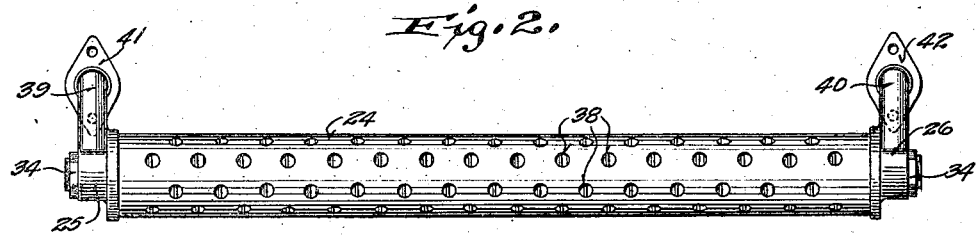
Fig. 2 is a front elevational view of one form of heating member constructed in accordance with the present invention.
Figures 3, 4:
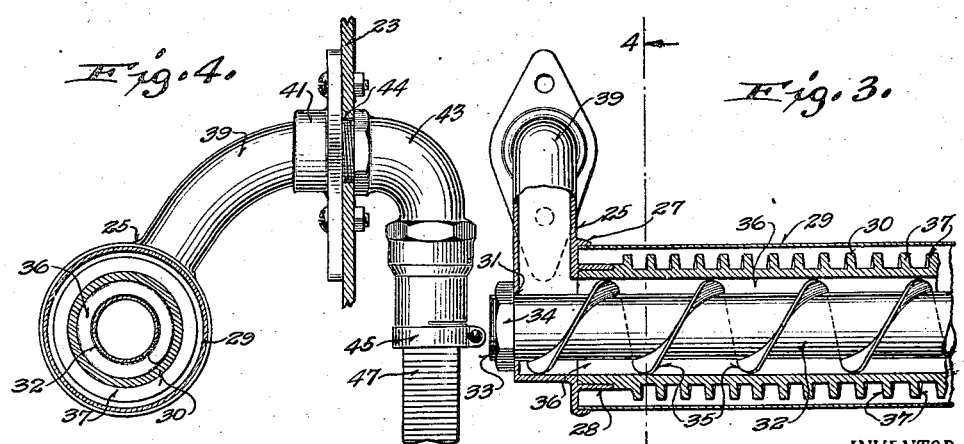
Fig. 3 is a fragmentary vertical sectional view of the heater shown in Fig. 2.
Fig. 4 is a transverse sectional view, taken approximately on the plane indicated by the line 4—4 of Fig. 3, looking in the direction of the arrows.

The said heating element, as is best shown in Figs. 2, 3 and 4, comprises a pair of bracket members, 25 and 26, which are hollow, see Fig. 3, and each of which is provided with a pair of concentric annular flanges, 27 and 28, adapted to receive the pipes or tubes, 29 and 30, respectively. The said bracket members, 25 and 26, are also provided with the holes 31, which are concentrically arranged with respect to the flanges, 27 and 28, through which holes the inner tube 32 passes. The said tube 32 is threaded on its extreme ends, as indicated at 33, to receive the nuts 34, whereby the parts may be maintained in their assembled relations, as will be readily understood.

The innermost tube 32 is provided on its outer surface with a spiral flange or rib 35, the outer edge of which is adapted to engage the inner surface of the tube 30 and to thereby provide a spiral passage 36, the ends of which communicate with the hollow end brackets 25 and 26, as will be readily understood.

The outer surface of the pipe or tube 30 is preferably provided with projections 37 to assist in the radiation of the heat, which projections as illustrated in Fig. 30, comprise an integral spiral rib or fin, extending substantially the full length of the tube. However, it is obvious that if desired, the projections may take the form of concentric fins, similar to those commonly employed on the cylinders of air-cooled internal combustion engines, or they may take any other shape which may be desired.

The outer tube 29 of the heating element is provided with a plurality of holes or perforations 38, to facilitate the escape of the heated air from within the said tube, which tube comprises a protecting sleeve or guard to keep the feet of the persons in the car from coming in direct contact with the hot radiating tube 30.

The tubular portions, 39 and 40 of the brackets 25 and 26 are provided with the flanged sockets 41 and 42 respectively, by means of which they may be secured to the dashboard 23, as will be clear from Figs. 1 and 4 of the drawings. Threaded elbows 43 extend through openings 44 in the said dashboard and communicate with the said tubular portions 39 and 40 of the brackets, 25 and 26, as will be readily understood, and the said elbows have connected to their other ends, as by the clamping means 45, the flexible tubes or pipes 46 and 47, leading respectively from the exhaust manifold of the motor and to the muffler or other discharge.

In order to control the passage of the hot gases from the exhaust manifold 22 to the heater, there is interposed between the said exhaust manifold and the end of the flexible tube 46 a suitable controlling valve 50, which is shown in detail in Figs. 5, 6, 7 and 14. This said valve is, or may be, of the well known butterfly type in which the oscillating valve member 51 is adapted to be moved from full open to full closed position by a movement of its controlling lever 52 through one-eighth of a circle.

Figure 14:
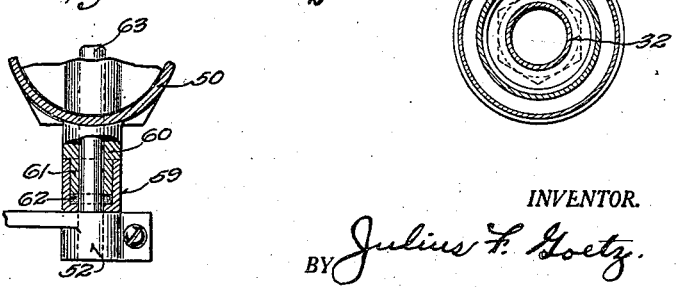

The movements of the said valve are preferably controlled by means of a push rod 55, shown in detail in Fig. 8, to one end of which is connected a length of piano wire 56 which passes through a tube 57, one end of which is secured to the casing 58, which houses the said push rod 55, while the other end of the said tube 57 is secured to a bracket 59 clamped upon the boss or extension 60, with which the casing of the valve 50 is provided, see Fig. 14. The said boss 60 may be provided with a reduced extension 61, fitting within the hub of the bracket 59, and a suitable packing material 62 may be interposed between the end of the reduced extension 61 and the bottom of the bore of the said hub, as will be clear from Fig. 14, which packing will act as a stuffing box to prevent the escape of the hot gases around the valve shaft 63.

The lower end of the piano wire 56 extends out of the lower end of the tube or casing 57 and is suitably connected to the valve arm 52 as at 64, see Figs. 5 and 7.

The push member 56 may be of any convenient form, but it preferably is provided with means for adjusting the valve 51 in different positions whereby the degree of heat may be controlled. As shown in Fig. 8, this adjustment may be accomplished by means of suitable grooves 65, running around the rod 55, which grooves are adapted to receive the balls 66 which are normally urged into engagement with the said rod 55 by means of the springs 67.

It thus results that when the rod 55 is pushed or pulled in one direction or the other by means of its button or fingerpiece 68, it will be maintained in any desired position, due to the engagement of the balls 66 with the grooves 65, as will be readily understood.

In the somewhat modified form of push member, shown in Figs. 9 and 10, the grooves 65 are omitted, and in lieu thereof a single spiral groove 70 is cut upon the rod 55. It thus results that when the balls 66 engage this spiral groove and the push rod 55 is rotated, relative fine adjustments of the valve member 51 may be obtained, due to the screw threading action resulting from the engagement of the said walls with the said spiral groove 70.

In this form of push rod it is desirable to provide a swivel connection 71 between the upper end of the piano wire and the push rod 55, in order that the said wire will not be rotated but will only be subjected to longitudinal movement.

The flexible tube 46 may be connected to the valve 50 by means of a suitable clamping device 72, which may be similar to the clamping device 45 above mentioned, and the lower end of the valve casing may be threaded as indicated at 73 for direct engagement with the exhaust manifold 22, as will be readily understood.

The operation of the heater will be clear from the foregoing, but it may be briefly summarized as follows. When it is desired to heat the air in the body of the vehicle adjacent the driver's seat, the push rod 55 may be pulled out by hand to any desired distance, thereby through its piano wire connection 56 opening the butterfly valve member 51 a predetermined degree. This will permit the exhaust gases from the manifold 22 to pass through the flexible tube 46 to the bracket 26, and thence through the spiral passage 36 to the bracket 25, from whence they may pass by way of the flexible tube 47 to the muffler or other discharge, and be finally exhausted to the atmosphere. In passing through the heating device they will give up a large portion of their heat units, which will raise the temperature of the tubes, 30 and 32, and this heat will be efficiently radiated to the surrounding air from the said tubes, thereby warming the occupant of the vehicle.

Figure 11:
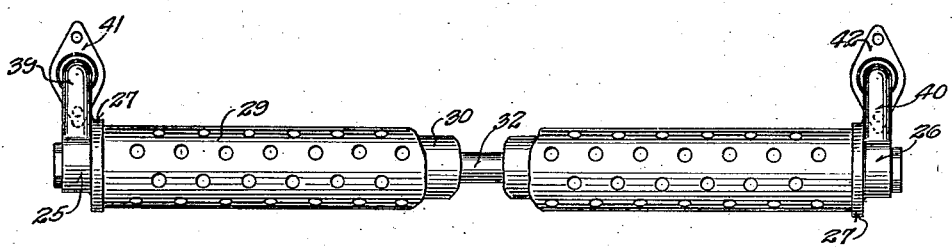
Fig. 11 is an elevational view, partly broken away, of a somewhat modified form of heating element.
Figure 12:
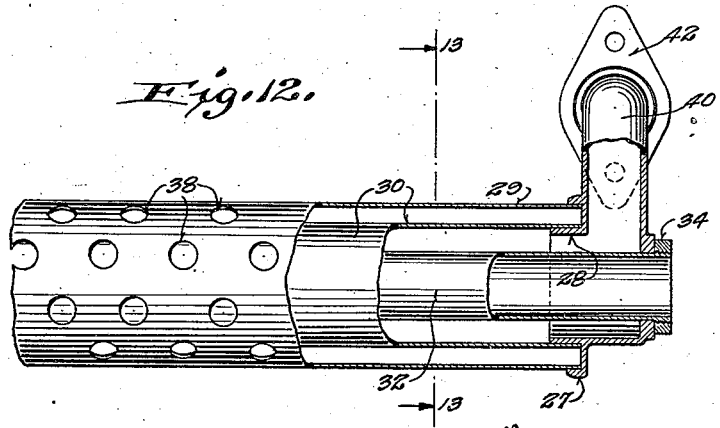
Fig. 12 is an enlarged fragmentary detail view, partly in section and partly in elevation, of one end of the element shown in Fig. 11.
Figure 13:
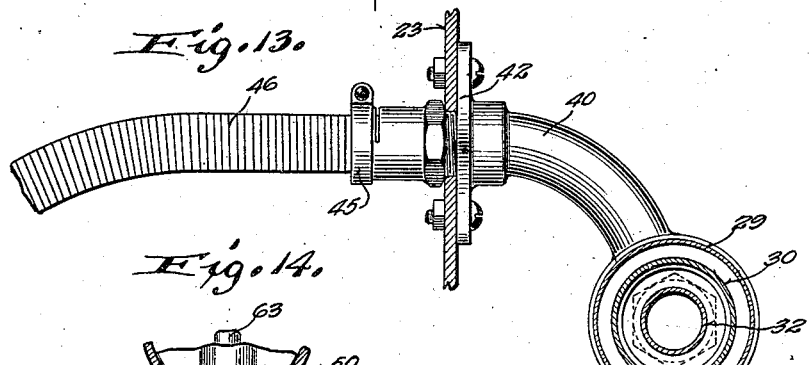
Fig. 13 is a transverse vertical sectional view taken approximately on the plane indicated by the line 13—13 of Fig. 12, looking in the direction of the arrows; and, Fig. 14 is an enlarged fragmentary sectional plan view of a portion of the valve shown in Figs. 5, 6 and 7.

The form of the invention shown in Figs. 11, 12 and 13 is generically the same as that above disclosed, but the spiral flange 35 has been omitted from the inner tube 32 and the heat radiating fins or flanges 37 have been omitted from the heating tube 30. Otherwise the construction is substantially the same as that illustrated in Figs. 1 to 4 inclusive.

While several forms of the invention have been illustrated and described, it is obvious that those skilled in the art may vary the details of construction as well as the arrangement of parts without departing from the spirit of the invention and therefore it is not wished to be limited to the above disclosure except as may be required by the accompanying claims.

What is claimed is:

1. In an automobile heater, a pair of hollow bracket members, the outer walls of which are provided with openings, and the inner walls of which are provided with concentrically arranged flanges; a pair of tubes arranged between said bracket members engaging said flanges, whereby they are maintained in concentric spaced relation; a third tube within said other tubes, extending through the openings in said outer walls; means carried by said third tube for providing a tortuous passage between it and the surrounding tube; and means carried by said third tube for maintaining the parts in assembled relations.

2. In an automobile heater, a pair of hollow bracket members, the outer walls of which are provided with openings, and the inner walls of which are provided with concentrically arranged flanges; a pair of tubes arranged between said bracket members engaging said flanges, whereby they are maintained in concentric spaced relation; a third tube within said other tubes, extending through the openings in said outer walls; means carried by said third tube for providing an elongated spiral passage between it and the surrounding tube, said passage communicating with said hollow bracket members; and means carried by said third tube for maintaining the parts in assembled relations.

3. In an automobile heater, a pair of hollow bracket members, the outer walls of which are provided with openings, and the inner walls of which are provided with concentrically arranged flanges; a pair of tubes arranged between said bracket members engaging said flanges, whereby they are maintained in concentric spaced relation; a third tube within said other tubes, extending through the openings in said outer walls; means comprising a rigid spiral flange carried by said third tube for providing an elongated spiral passage between it and the surrounding tube, said passage communicating with said hollow bracket members; and means carried by said third tube for maintaining the parts in assembled relations.

4. In an automobile heater, a pair of hollow bracket members, the outer walls of which are provided with openings, and the inner walls of which are provided with concentrically arranged flanges; a pair of tubes arranged between said bracket members engaging said flanges, whereby they are maintained in concentric spaced relation; one of said tubes being provided with heat radiating fins; a third tube within said other tubes, extending through the openings in said outer walls; and means carried by said third tube for maintaining the parts in assembled relations.

In testimony whereof, I affix my signature.

JULIUS F. GOETZ.